(12) United States Patent
Vaughan

(10) Patent No.: US 9,051,196 B2
(45) Date of Patent: Jun. 9, 2015

(54) BAFFLE PLATE FOR A WATER TREATMENT DEVICE

(71) Applicant: Clack Corporation, Windsor, WI (US)

(72) Inventor: Don Vaughan, Waunakee, WI (US)

(73) Assignee: Clack Corporation, Windsor, WI (US)

( * ) Notice: Subject to any disclaimer, the term of this patent is extended or adjusted under 35 U.S.C. 154(b) by 72 days.

(21) Appl. No.: 13/836,900

(22) Filed: Mar. 15, 2013

(65) Prior Publication Data
US 2014/0263076 A1 Sep. 18, 2014

(51) Int. Cl.
*C02F 1/42* (2006.01)
*B01J 49/00* (2006.01)
*C02F 1/00* (2006.01)

(52) U.S. Cl.
CPC ............... *C02F 1/42* (2013.01); *B01J 49/0004* (2013.01); *C02F 1/006* (2013.01); *C02F 2001/425* (2013.01)

(58) Field of Classification Search
USPC .......................................... 210/678, 456, 687
See application file for complete search history.

(56) References Cited

U.S. PATENT DOCUMENTS

| | | | | |
|---|---|---|---|---|
| 1,775,412 A * | 9/1930 | Tannehill | ........................ | 210/191 |
| 2,467,435 A * | 4/1949 | Langhurst | ..................... | 202/173 |
| 3,704,785 A * | 12/1972 | Marsh | ............................ | 210/285 |
| 4,396,402 A * | 8/1983 | Ghosh | ......................... | 48/197 A |
| 5,133,991 A * | 7/1992 | Norman et al. | ................. | 427/136 |
| 5,328,673 A * | 7/1994 | Kaczur et al. | .................. | 423/235 |
| 6,183,720 B1 * | 2/2001 | Laederich et al. | ......... | 423/658.5 |
| 2002/0131913 A1 * | 9/2002 | Tamata et al. | .................. | 422/171 |
| 2008/0096268 A1 * | 4/2008 | Herner et al. | .................. | 435/266 |

* cited by examiner

*Primary Examiner* — Chester Barry
(74) *Attorney, Agent, or Firm* — Boyle Fredrickson, S.C.

(57) ABSTRACT

A fluid treatment device includes a tank containing a fluid treatment medium and a fluid. A distributor plate is received in the tank and separates the bed from a lower end portion of the tank. A baffle is positioned beneath the distributor plate and is configured to direct fluid exiting a riser tube of the fluid treatment device toward the peripheral of the tank to thereby provide a more evenly-distributed flow through the radius of the distributor plate and through the fluid treatment medium. The baffle may have a downwardly facing concave surface that traps air bubbles generated during a brine draw operation.

15 Claims, 4 Drawing Sheets

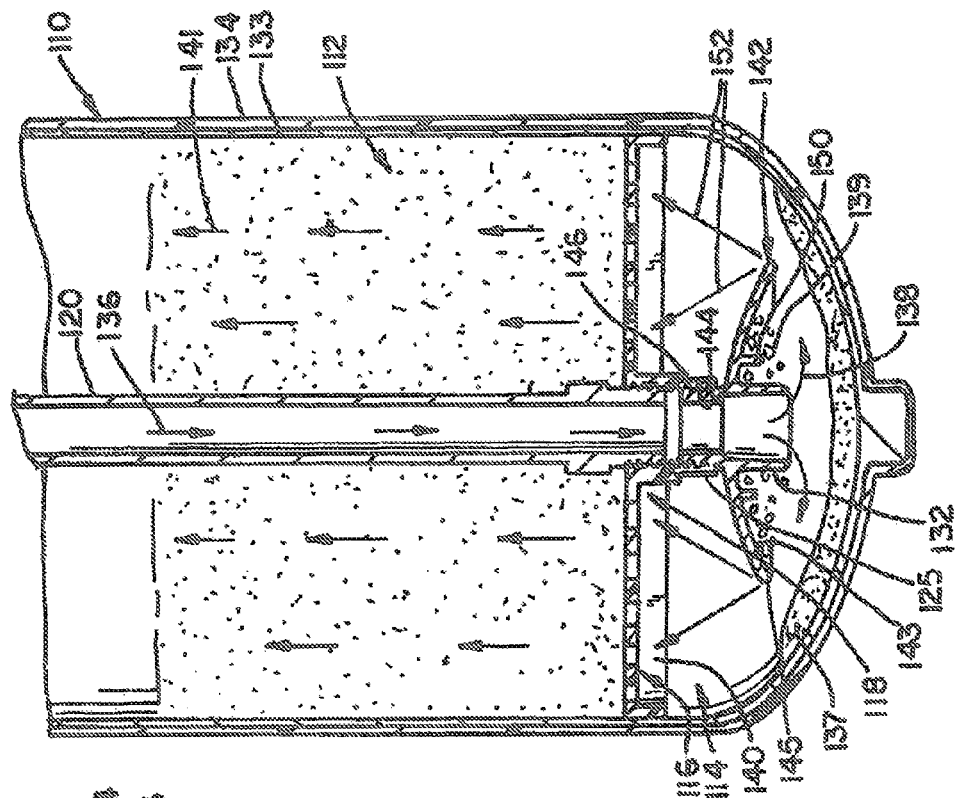
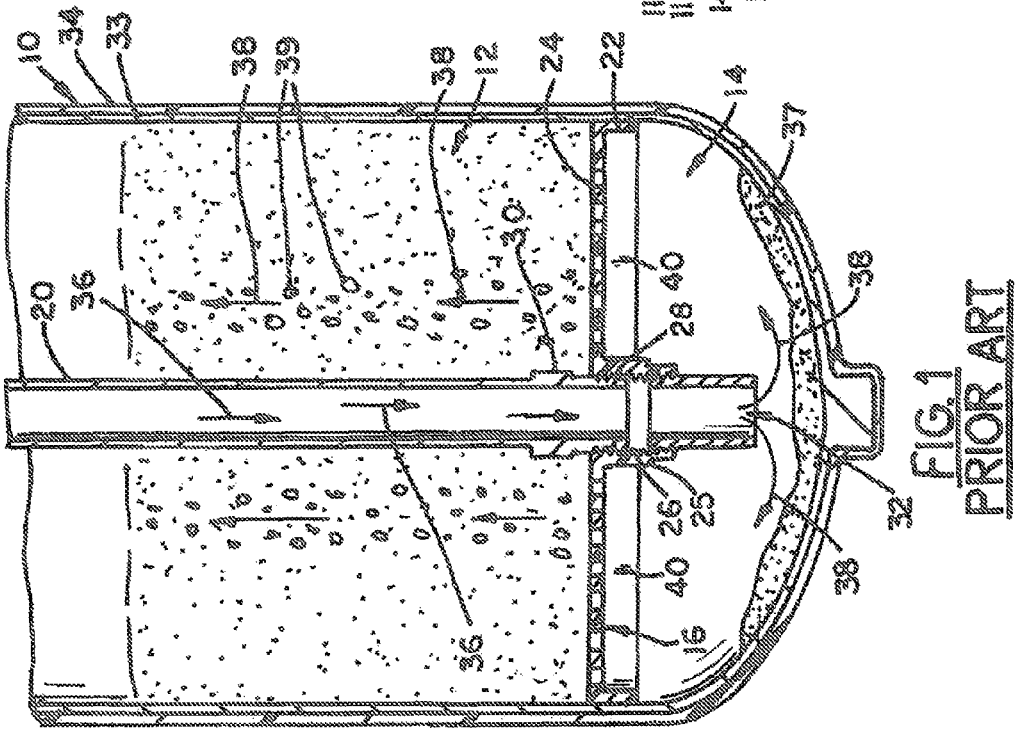

BAFFLE PLATE FOR A WATER TREATMENT DEVICE

BACKGROUND OF THE INVENTION

1. Field of the Invention

The invention generally relates to fluid treatment system distributor plates and, more particularly, to a distributor plate assembly including a secondary baffle plate positioned beneath the primary distributor plate of such a system.

2. Discussion of the Related Art

Water softeners are widely used for removing calcium and other deposit causing materials from so-called "hard-water." The typical water softener relies on an ion exchanges process taking place in an ion-exchange resin bed stored in a resin tank or pressure vessel of the water softener. As the water to be processed passes through the resin-filled tank, ions of calcium and other minerals in the water are exchanged with ions found in the resin, e.g., sodium, thereby removing objectionable ions from the water and exchanging them for less objectionable ions from the resin.

The capacity of the resin to exchange ions is finite and is reduced during the ion exchange process. If measures are not taken to regenerate the resin by replacing the undesirable ions with desirable ions, the ion exchange capacity of the resin will become exhausted. Water softeners are typically configured to periodically regenerate the ion exchange resin stored in the resin tank. Regeneration typically involves chemically replacing the objectionable ions such as calcium ions from the resin with less objectionable ions such as sodium ions. The replacement is usually performed by introducing a regenerant solution of sodium chloride or potassium chloride into the resin bed from a brine tank and thereafter flushing the regenerant solution from the bed, i.e., brining. Regeneration of a water softener resin bed is sometimes accomplished in a direction that is co-current with the flow of water to be treated (often referred to as "downflow regeneration" or "service flow") and is sometimes accomplished in a direction counter-current to the flow of the water being treated (often referred to as "upflow regeneration" or "backwash flow"). The resin bed is typically backwashed in order to remove trapped particulate matter, and the resin tank can be rinsed to remove objectionable soluble materials. In order to prevent interruption of service, most water softeners are configured to allow bypass of untreated water directly to the service lines during backwash, rinse, and regeneration.

Resin tanks typically employ a distributor plate that allows water to flow through either a filter media bed or an ion exchange bed. Such distributor plates are configured to distribute flow as evenly as possible across the bed to ensure that the entirety of the bed is treated. However, such distributor plates do not operate as efficiently as is desired, particularly in resin tanks employing an upflow brining system. Upflow brining involves forcing water from the brine tank downward through a central riser tube to the bottom of the resin tank and then upward, i.e., upflow, through the distributor plate and the resin bed and out of the top of the tank.

During the brining operation, and particularly the brine draw operation where the brining solution is drawn up through the resin bed, gasses trapped in the fluid are disassociated and form bubbles, which float up through the distributor plate. The bubbles tend to float directly up near the centrally located riser tube and form channels through the resin bed media through which fluid tends to flow, effectively short circuiting the flow of brine past the media.

Further, after the brining process is complete, a slow rinse phase occurs, which is configured to remove excess brine from the resin bed. In the slow rinse phase, raw, untreated water (or, in some systems, treated water) is delivered to the lower end of the resin tank by the riser tube. However, as the rinse water exits bottom of the riser tube, it tends to immediately percolate up through the distributor plate along the riser tube rather than flowing out toward the edge of the tank. This concentrated flow near the riser tube results in the water being concentrated near the center of the tank, leading to insufficient rinsing of media located near the outer edge of the tank.

At least some of these issues are not unique to resin tanks of water conditioning system but, instead, are of a concern in a variety of fluid treatment systems in which a treatment medium is subject to brining.

The need therefore exists to provide a resin tank configured to more uniformly distribute water or other fluid across the entirety of the resin tank during a brining phase and/or a slow rinse phase of an upflow brining process.

SUMMARY OF THE INVENTION

In accordance with a first aspect of the invention, a fluid treatment device is provided that includes a tank containing a bed of fluid treatment media and a fluid. A distributor plate is received in the tank and separates the bed from a lower end portion of the tank. A secondary plate or baffle is positioned beneath the distributor plate. The baffle is configured to direct a rinsing fluid delivered to the lower end around an edge of the baffle to improve flow distribution radially across the tank. The baffle may have a downwardly facing concave surface configured to trap air bubbles generated, for example, during the brining phase of a media regeneration cycle.

The baffle may extend radially approximately halfway between a hub of the distributor plate and an outer edge of the tank. The baffle may be positioned, relative to vertical, about halfway between a bottom of the tank and an underside of the distributor plate.

In accordance with another aspect of the invention, a method of operating a fluid treatment device comprises delivering a fluid to a lower end portion of a resin tank through a centrally located riser tube. The method further comprises diverting the fluid outwardly from the riser tube with a baffle positioned beneath the distributor plate to thereby distribute the fluid radially across the tank. The method may also comprise trapping air bubbles beneath a concave bottom surface of the baffle.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which:

FIG. 1 is a sectional side elevation view of a bottom portion of a pressure vessel according to the prior art and is appropriately labeled "PRIOR ART";

FIG. 2 is a sectional side elevation view of a pressure vessel including a secondary plate according to an aspect of the present invention;

DETAILED DESCRIPTION OF THE PREFERRED EMBODIMENTS

Figure 3:
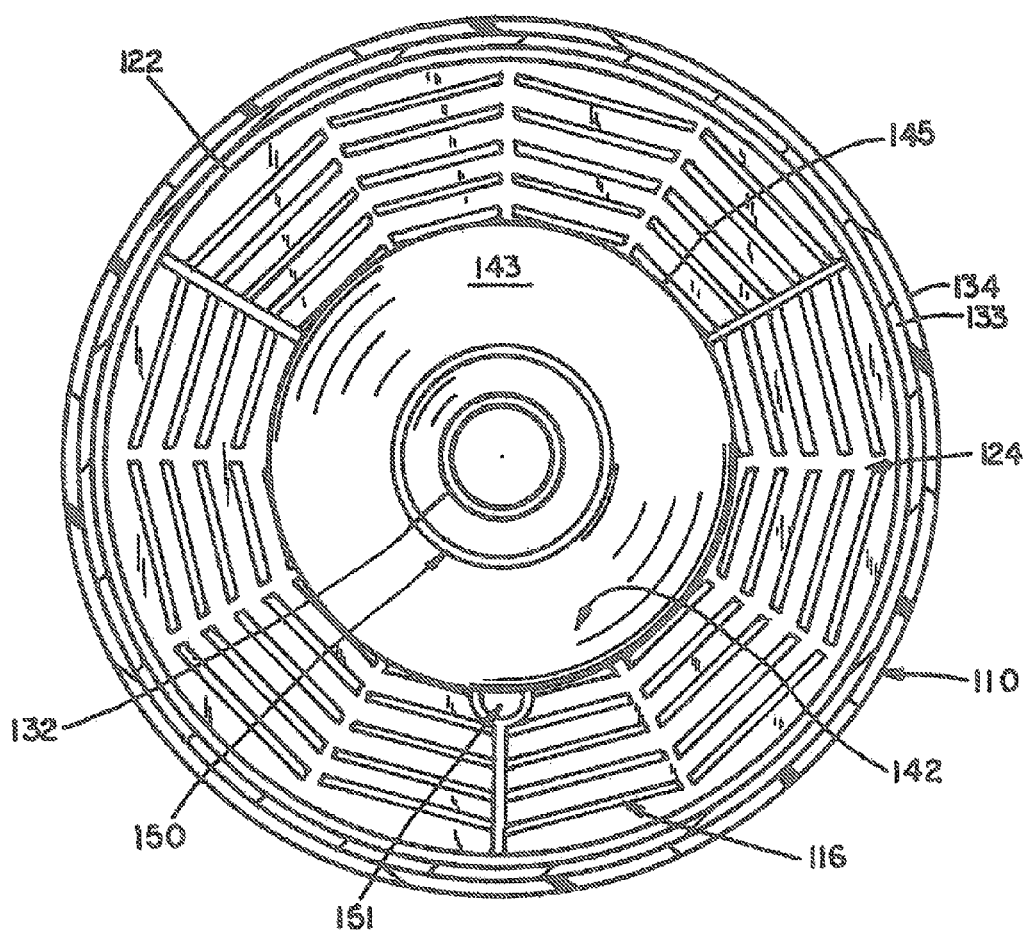
FIG. 3 is a sectional bottom plan view of the pressure vessel taken from beneath the secondary plate.

Referring now to the drawings and, initially, FIG. 1, a prior art resin tank 10 used in a water treatment system (not shown). One of a variety of water treatment systems with which the resin tank 10 is usable is disclosed in U.S. Pat. No. 6,402,944, the contents which are incorporated herein by reference. The tank 10 includes a blow-molded plastic liner 33 reinforced by a layer 34 of fiberglass wrap or the like. The interior of the tank 10 contains a resin bed 12 separated from a lower end portion 14 of the tank 10 by a distributor plate 16. The distributor plate 16 comprises a central hub 18 through which a distributor or riser tube 20 is securely received such that the distributor plate 16 is capable of supporting the riser tube 20. The distributor plate 16 further includes an outer ring 22, which is bonded to the interior wall of the resin tank liner 33 forming the outer edge of the tank 10. A slotted plate 24, supported by a number of reinforcing ribs 40, is provided between the hub 18 and the outer ring 22 and is configured to allow water to pass through the distributor plate 16 between the resin bed 12 and the lower end portion 14 of the tank 10. The distributor plate 16 may be integrally constructed from a plastic or similarly suitable material. The hub 18 defines a flange 25 which extends downwardly from an upper surface of the distributor plate 16. The flange 25 may include a threaded portion 26 configured to engage a corresponding threaded portion 28 on the bottom 30 end of the riser tube 20. An inlet tube 32, positioned beneath the bottom end 30 of the riser tube 20, extends downwardly through the distributor plate 16 in communication with the lower end portion 14 of the tank 10.

As is generally understood in the art, in upflow brining, a brine solution is passed down the riser tube 20 to the lower end portion 14 of the resin tank 10. The brine then flows upwardly through the distributor plate 16 and then through the resin bed 12 and eventually out of the resin tank 10. Because the brine solution is heavier than water, the brine solution tends to puddle or pool underneath the distributor plate 16. With the relatively low velocities involved with pushing the brine solution up through the distributor plate 16 and the resin bed 12, a portion of the brine solution begins to puddle or pool underneath the distributor plate 16 after all of the brine solution has been delivered to the lower end portion 14 of the tank 10. Further, during the delivery of the brine solution to the lower end portion 14, gasses trapped in the water are disassociated and form air bubbles 39. These bubbles 39 float up through the resin bed 12 and create channels along the riser tube 20 through which the brine solution may be preferentially directed, which thereby prevents or at least inhibits the brine solution from reaching the outer edge of the resin tank 10.

After the brine solution is delivered to the resin bed 12, the fluid treatment system operates in a so-called "slow rinse" phase of the water treatment cycle to clear any remaining brine solution from the resin tank 10, typically using untreated or raw water, or in some cases treated water, both of which have a lower density than the brine remaining in the tank. Because the slow rinse water is less dense in prior art fluid treatment systems such as that shown in FIG. 1, the water for the slow rinse phase begins to percolate directly upwardly near the distributor plate 16 almost immediately upon leaving the riser tube 20 and thus does not get evenly distributed across the radius of the resin tank 10, thereby resulting in less effective or even ineffective rinsing of the resin in the outer portions of the tank.

In particular, as indicated by arrows 36, during the slow rinse phase, water is introduced into the lower end portion 14 of the tank via the riser tube 20 and the inlet tube 32. The water flows out of the end of tube 32 and, as indicated by the arrows 38, immediately begins to rise nearly vertically upwardly near the distributor plate 16. Thus, the water is heavily concentrated near the riser tube 20 as indicated by arrows 41, resulting in an inefficient rinsing of the outer portion of the resin bed 12. Even this flow is hindered by the "unrinsed brine" accumulated on the bottom of the tank during the brining operation as shown at 37.

With reference now to FIGS. 2-3, a resin tank 110 is shown in accordance with an embodiment of the invention. Resin tank 110 and the associated distributor plate 116 are of generally the same construction as the corresponding components of the prior art resin tank 10 of FIG. 1 except for the fact that a secondary plate or baffle 142 is provide beneath the primary distributor plate 116. Since many of the structures and features of the resin tank 110 are identical to those of the resin tank 10 of FIG. 1, the foregoing descriptions thereof apply equally unless otherwise indicated. The reference numerals of the structures of FIG. 1 are incremented by 100 in FIGS. 2-5.

The secondary plate or baffle 142 is positioned vertically between the bottom surface of the tank 110 and distributor plate 116. It may be mounted directly or indirectly on the hub 118 of the distributor plate 116, the bottom of the tank 110, or the tank liner 133. It is indirectly mounted on the hub 118 in this embodiment by being coupled to the inlet tube 132. Hence, the baffle 142 may be coupled to inlet tube 132 or may be integrally formed therewith as shown. At least the bottom surface 143 of the baffle 142 is concave so as to face downwardly. The baffle 142 may also include a mounting ring 150 integrally formed and extending from the bottom surface 143 thereof. The mounting ring 150 may be configured to receive an accessory as will be described in additional detail herein.

As will be explained in additional detail hereinafter, the distributor plate 116 may include a port 151, which may be provided to allow an operator of the tank 110 to fill the lower end portion 114 of the tank 110 with an inert particulate media as discussed below.

The diameter of the baffle 142 is selected so as to position its circular outer edge 145 at a location that results in directing some fluid toward the outer edge of the tank 110 while still assuring that enough fluid flows up the inner portion of the resin bed 112 to achieve the desired relatively uniform flow throughout the radius of the resin bed 112. The ideal baffle diameter will depend on a number of factors including, but not limited to, the density, viscosity, and flow rate of the fluid, as well as the vertical spacings between the baffle 142 and the bottom of the tank 110 and between the baffle 142 and the bottom of the distribution plate 116. In a preferred construction of the baffle 142, the outer edge 145 of the baffle 142 is positioned between 20% and 80%, more preferably 40% to 70%, and most preferably approximately halfway between the flange 125 of the hub 118 and outer edge of the tank 110 as defined by the inner surface of the liner 133. Further, in a preferred construction of the baffle 142, the concavity of the baffle 142 is sized to define a volume of sufficient size to accommodate a worst-case scenario with respect to the amount of bubbles 139 that may be formed during the brining process so as to be capable of at least substantially entirely capturing the bubbles 139.

The baffle 142 may be spaced in any number of positions relative to vertical with respect to the distributor plate 116. For a given baffle diameter, the nearer to the distributor plate 116 that the baffle 142 is positioned, the better the baffle 142 is able to trap the bubbles 139, whereas the nearer to the bottom of the tank 110 the baffle is positioned, the better the baffle is at redirecting the water or fluid toward the outer edges of the tank 110 to better distribute the fluid from the slow rinse cycle evenly across the radius of the tank 110. In the illustrated embodiment in which diameter of the baffle 142 is about half that of the tank 110, the baffle 142 is positioned approximately halfway between the bottom of the distributor plate 116 and the bottom of the tank 110.

In operation, during the slow rinse phase, the water is delivered to the lower end portion 114 of the tank via the riser tube 120 and the inlet tube 132 as indicated by the arrows 136. However, unlike in the prior art systems, as the water exits the riser tube 120, the water is forced outwardly toward the outer edge of the resin tank 110 as indicated by arrows 138. As the water reaches the edge of the baffle 142, it flows around the past the outer edge 145 of the baffle 42. From there some of the water flows toward the riser tube 120 and the center of the resin tank 110, and some is diverted toward the outer edge of the resin tank 110 as illustrated by arrows 152. In this manner, the water used for the slow rinse cycle is more evenly distributed across the entire radius of the resin tank 110 as illustrated by arrows 141 and therefore is better able to entirely rinse the resin bed 112 of the brine solution. Further, as opposed to the prior art, the air bubbles 139 are caught underneath the baffle 142 and thus at least substantially prevented from floating up toward the distributor plate 116, thus preventing the formation of a channel through the resin bed 112 through which the water or other fluid may flow. The bubbles 139 may then be subsequently removed during the so-called "fast rinse" phase of the water treatment cycle.

Figure 4:
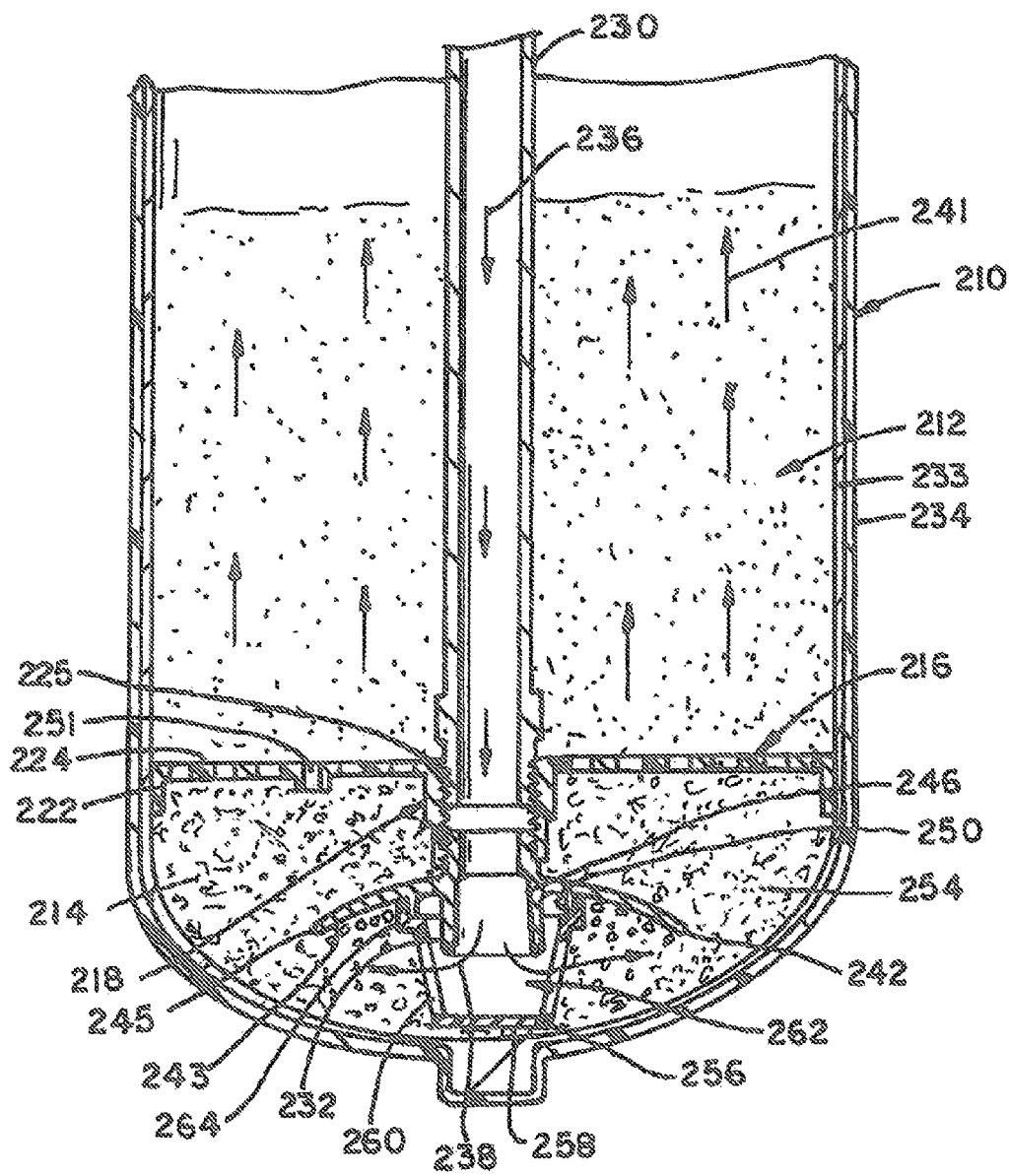
FIG. 4 is a sectional side elevation corresponding to FIG. 2 and additionally illustrating a guard coupled to the secondary plate.
Figure 5:
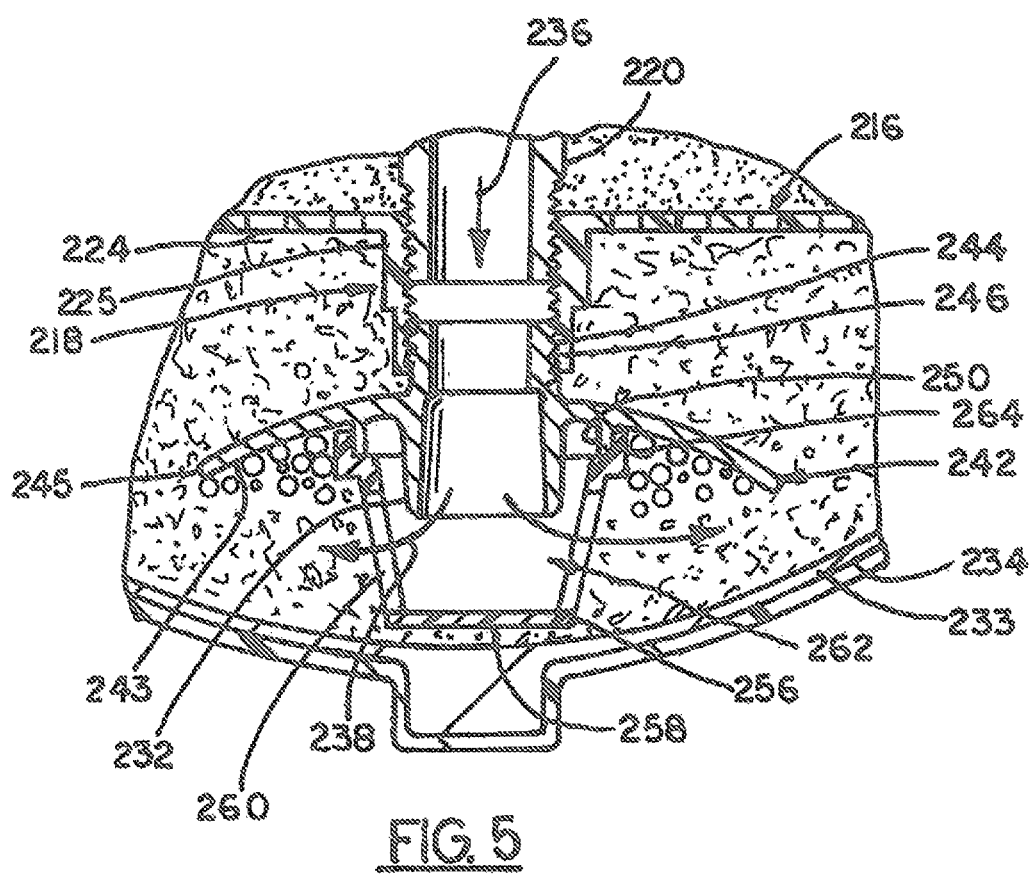
FIG. 5 is a partial sectional side elevation view showing the secondary plate and guard in additional detail.

With reference now to FIGS. 4 and 5, another embodiment of the present invention is illustrated. In the present embodiment, the structures of the tank 210 are identical to those of the first embodiment illustrated in FIGS. 2 and 3 unless otherwise indicated, and the structures are numbered as in FIGS. 2 and 3 and incremented by 100.

In the present embodiment, the distributor plate 216 and the baffle 242 are of identical construction to the corresponding components of the first embodiment. In addition, the lower end portion 214 of the tank 210 is filled with an inert media, generally shown as numeral 254. The media may be introduced to the lower end portion 214 via the port 251 in the distributor plate 216 corresponding to the port 151 of the first embodiment (see FIG. 3) after installation of the plates 216, 242 and related components into the tank 210. Alternatively the inert media may be inserted prior to installation of the plates 216, 242 and related components. In either case the case, the port 251 is plugged after insertion of the inert media to prevent unwanted matter from moving through the distributor plate 216 in either direction.

Preferably, substantially the entirety of the volume of the tank 210 beneath the distributor plate 216 is filled with the inert media 254 in order to minimize the volume where brine will be trapped during operation. Accordingly, the inert media may be either heavier than or lighter than the fluid of the fluid treatment tank. The inert media 254 is preferably granular and may be in the form any or all of gravel, polypropylene beads, polyethylene beads, etc. The inert media 254 thereby minimizes and reduces the void volume beneath the distributor plate 216. Since the volumetric flow rate of rinse water is the same (typically about 2.5 gallons per minute) whether or not the inert media is present in the bottom portion of the tank, the presence of the media causes the rinse water through flow in the bottom portion 214 of the tank 210 at a higher velocity, improving the flushing of unrinsed brine from the bottom portion 214 of the tank 210 and improving the rinse phase overall.

A guard 256 may be coupled to the mounting ring 250 of the baffle 242. The guard 256 is configured to protect the bottom of the inlet tube 232 from the ingress and egress of the inert material 254 during operation. The guard 256 may be sized and shaped in any manner so long as the guard 256 is capable of preventing the intrusion of the inert media 254. As illustrated, the guard 256 is generally frusto-conically shaped and includes a relatively flat bottom 258, a circumferential sidewall 260 having a plurality of apertures, holes, or other such openings 262 to allow for fluid flow therethrough, and a flanged upper end 264, which is configured to be coupled with the mounting ring 250. The openings 262 of the guard 256 preferably are sized and shaped to prevent the inert media 254 from entering the guard 256 and, thereby, the inlet tube 232 and the riser tube 220. The guard 256 may be integrally molded with the mounting ring 250 or connected to the mounting ring 250 by any other suitable mechanism.

Although the best mode contemplated by the inventors of carrying out the present invention is disclosed above, practice of the present invention is not limited thereto. It will be manifest that various additions, modifications and rearrangements of the aspects and features of the present invention may be made in addition to those described above without deviating from the spirit and scope of the underlying inventive concept. The scope of some of these changes is discussed above. The scope of other changes to the described embodiments that fall within the present invention but that are not specifically discussed above will become apparent from the appended claims and other attachments.

I claim:

1. A fluid treatment device comprising,
a tank containing a bed of fluid treatment media;
a distributor plate received in the tank and extending across an entire inner diameter of the tank to separate the bed from a lower end portion of the tank;
a tube extending downwardly through the tank and through an opening in the distributer plate, the tube having a lower opening through which a liquid fluid, flowing downwardly through tube, exits the tube, and
a baffle located beneath the distributor plate and having an upper opening through which the tube passes, the baffle being configured to direct fluid exiting the lower opening in the tube toward an outer edge of the tank and thereby allow the fluid to flow past an edge of the baffle, upwardly through the distributor plate, and at least generally uniformly across a radius of the bed.

2. The fluid treatment device of claim 1, wherein the baffle is imperforate except for the upper opening therein, and wherein the baffle has a concave lower surface configured to trap air bubbles.

3. The fluid treatment device of claim 1, wherein the baffle is mounted on an underside of the distributor plate.

4. The fluid treatment device of claim 1, wherein the baffle extends radially about halfway between a hub of the distributor plate and the outer edge of the tank.

5. The fluid treatment device of claim 1, wherein the baffle is positioned vertically about halfway between a bottom of the tank and an underside of the distributor plate.

6. The fluid treatment device of claim 1, wherein the upper opening of the baffle is located radially centrally of the tank.

7. A baffle for a fluid treatment system having a resin tank containing a bed of fluid treatment media, a distributor plate received in the tank and extending across an entire inner diameter of the resin tank to separate separating the bed from a lower end portion of the resin tank, and a tube extending downwardly through the resin tank and through an opening in the distributer plate, the tube having a lower opening through which a liquid fluid, flowing downwardly from the tube, exits the tube, the baffle comprising:
- a body configured to extend radially toward an inner wall of the resin tank;
- a central opening configured to receive the tube such that a lower opening of the tube is positioned beneath the central opening in the baffle;
- wherein the baffle is configured to be positioned beneath the distributor plate and is configured to direct fluid exiting the lower opening in the tube toward an outer edge of the resin tank and thereby allow the fluid to flow past an outer radial edge of the baffle, upwardly through the distributor plate, and at least generally uniformly across a radius of the bed.

8. The baffle of claim 7, wherein the body is imperforate except for the central opening therein and has a downwardly facing concave surface configured to trap air bubbles.

9. The baffle of claim 7, wherein the body is sized to extend radially about halfway between a hub of the distributor plate and an outer ring of the distributor plate.

10. A method of operating a fluid treatment device comprising a tank containing a bed of a fluid treatment media, a distributor plate received in the tank and extending across an entire inner diameter of the tank to separate the bed from a lower end portion of the tank, and a tube extending downwardly through the tank and through an opening in the distributer plate, the tube having a lower opening, the method comprising the steps of:
- delivering a liquid fluid downwardly through the tube, through the lower opening in the tube, and to the lower end portion of the tank;
- diverting the fluid radially outwardly from the lower opening in the tube with a baffle to generally evenly distribute the fluid radially across the tank, the baffle being located beneath the distributor plate and having an upper opening through which the tube passes; and
- directing fluid upwardly through the distributor plate and the bed in a manner that is generally evenly distributed across a radius of the bed.

11. The method of claim 10, further comprising the step of guiding a portion of the fluid toward the tube after the fluid passes an edge of the baffle.

12. The method of claim 10, wherein the baffle is imperforate except for the upper opening therein, and further comprising the step of trapping air bubbles underneath a concave surface of the baffle.

13. The baffle of claim 7, wherein the baffle is configured to be positioned vertically about halfway between a bottom of the tank and an underside of the distributor plate.

14. The fluid treatment device of claim 1, wherein the fluid treatment device comprises a portion of a water softener system, the tank comprises a resin tank, the bed comprises a resin bed, and the fluid comprises a brine solution.

15. The method of claim 10, wherein the fluid treatment device comprises part of a water softener system, the tank comprises a resin tank, the bed comprises a resin bed, and the fluid comprises a brine solution.

* * * * *